United States Patent
Wang et al.

(10) Patent No.: US 9,002,644 B2
(45) Date of Patent: Apr. 7, 2015

(54) METHODS AND DEVICES FOR PROVIDING GUARANTEED QUALITY OF SERVICE

(75) Inventors: Min Wang, Lulea (SE); Marten Ericson, Lulea (SE)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

(21) Appl. No.: 14/000,371

(22) PCT Filed: Feb. 18, 2011

(86) PCT No.: PCT/SE2011/050186
§ 371 (c)(1),
(2), (4) Date: Aug. 19, 2013

(87) PCT Pub. No.: WO2012/112097
PCT Pub. Date: Aug. 23, 2012

(65) Prior Publication Data
US 2013/0332075 A1    Dec. 12, 2013

(51) Int. Cl.
| | | |
|---|---|---|
| G01C 21/00 | (2006.01) | |
| G01C 21/34 | (2006.01) | |
| H04W 28/24 | (2009.01) | |
| H04W 64/00 | (2009.01) | |

(52) U.S. Cl.
CPC ............ *G01C 21/00* (2013.01); *G01C 21/3453* (2013.01); *H04W 28/24* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2003/0195698 A1* | 10/2003 | Jones ........................... | 701/201 |
| 2005/0143090 A1 | 6/2005 | Dowling | |
| 2007/0208502 A1* | 9/2007 | Sakamoto et al. ............ | 701/205 |
| 2007/0211676 A1 | 9/2007 | Sharma et al. | |
| 2008/0253332 A1* | 10/2008 | Ore et al. ..................... | 370/331 |
| 2009/0023456 A1 | 1/2009 | Seacat et al. | |
| 2009/0245118 A1 | 10/2009 | McCormick | |
| 2010/0036604 A1 | 2/2010 | O'Connell et al. | |
| 2010/0198494 A1* | 8/2010 | Chao et al. .................... | 701/200 |
| 2010/0277308 A1* | 11/2010 | Potkonjak ............... | 340/539.12 |

(Continued)

FOREIGN PATENT DOCUMENTS

| | | |
|---|---|---|
| EP | 2 088 818 A2 | 8/2009 |
| WO | 2009156554 A1 | 12/2009 |

OTHER PUBLICATIONS

Lee et al. "Bandwidth-reservation scheme based on road information for next-general cellular networks" Vehicular Technology, IEEE Transactions on, vol. 53, No. 1 pp. 243-252, 2004, 10 pgs.

(Continued)

*Primary Examiner* — Thomas Tarcza
*Assistant Examiner* — Adam Alharbi
(74) *Attorney, Agent, or Firm* — Vincent J. Allen; Stephen Y. Liu; Carstens & Cahoon, LLP

(57) ABSTRACT

In methods and devices for providing a guaranteed quality of service to a subscriber of a service in a cellular radio system, a start position and an end position are received along with a required quality of service, QoS. Cell site positions are associated with possible user geographical/street paths that will take the subscriber from the start position to the end position and search for paths that will guarantee the required QoS. Based on the search the path that best satisfies the entered input criteria is selected and output to the subscriber.

12 Claims, 3 Drawing Sheets

(56) References Cited

U.S. PATENT DOCUMENTS

2010/0330991 A1* 12/2010 Sydir et al. .................... 455/436
2011/0034179 A1* 2/2011 David et al. ................ 455/456.1

OTHER PUBLICATIONS

Pawar et al. "Towards Location Based QoS-Aware Network Selection Mechanism for the Nomadic Mobile Services" Consumer Communications and Networking Conference, 2009, CCNC 2009, 6th IEEE, 5 pgs.
Shah et al. "Reliability Issues in a SIP based Location Tracking Architecture" Wireless Broadband and Ultra Wideband Communications, 2007, the 2nd International Conference, 6 pgs.
Supplementary European Search Report, Application No. EP 11859000.9, mailed Oct. 7, 2014, 7 pages.

* cited by examiner

METHODS AND DEVICES FOR PROVIDING GUARANTEED QUALITY OF SERVICE

CROSS REFERENCE TO RELATED APPLICATION(S)

This application is a 35 U.S.C. §371 National Phase Entry Application from PCT/SE2011/050186, filed Feb. 18, 2011, designating the United States, the disclosure of which is incorporated herein in its entirety by reference.

TECHNICAL FIELD

The present invention relates to methods and devices for providing a guaranteed quality of service.

BACKGROUND

Fast evolving mobile communication technologies make it possible to enjoy high quality Guaranteed Bit Rate (GBR) services via a wireless connection even when users are moving. For example, users may listen to pop music that are downloaded from Internet when driving a car, or watch high-resolution TV from the web in a long-distance bus. Another example is that users can check the live video of home environments with mobile terminal in a bus.

When a user is stationary it is relatively easy to guarantee a Quality of Service (QoS) for GBR services, as long as the cell load is not too high, above some value. However, it becomes more difficult to achieve the high perceptional quality for a user when the user moves. The more a GBR user move, the more difficulties there will be to maintain the QoS for the GBR user due to handover and different load conditions in a new cell.

A conventional solution to guarantee QoS for a GBR user include priority-based scheduling policies, for example, the so-called delay scheduler which may take into account the packet delay and radio channel quality when scheduling packet transmission. A conventional solution can also include admission control (AC) or congestion control (CC), or some resource consumption limitation policies. These schemes are often used when the system is overloaded. In such a scenario, the resources will be mostly utilized for higher priority services because the system has scarce resources. It is also possible for the system to apply other types QoS schemes to guarantee the GBR users satisfied at higher probability. One example is that the GBR users may have different Handover (HO) triggering settings than the other users.

All above described schemes are designed mainly to enhance the system performance, for examples, increase the system capacity or coverage. However, the user performance metrics that are usually considered by the schemes are not enough. Thus, using conventional methods, the system sometimes may have to sacrifice some users so that those users will be badly serviced, in order to guarantee a good overall system performance.

Another problem is that existing methods for providing a guaranteed QoS are usually designed for a case where the users are slowly moving. This implies that the schemes may not work well in a case, where users have more mobility.

In short, mobility user using a GBR service may encounter several interruptions due to handover and even relatively long interruptions since some cells are very high loaded or have bad coverage.

Hence there exist a need for new methods and devices providing improved performance in cellular radio systems providing GBR services.

SUMMARY

It is an object of the present invention to provide an improved methods and devices to address the problems as outlined above.

This object and others are obtained by the methods and devices as set out in the appended claims.

In accordance with embodiments of the invention information about some relevant system parameters, such as coverage, number of handovers and possible cell load scenarios are used in a search for an optimal path going from A to B based on a map from a QoS perspective. As a result a best path going from a first position A to a second position B can be calculated in a device based on the input parameters and output as a suggested path from A to B.

In accordance with one embodiment the search for a best path to maintain a QoS can be provided as application, in particular a web based application. For example, based on the user QoS requirements, for example a wanted bit-rate of minimum 500 kbps, and the chosen path A to B given by the subscriber before he/she starts the journey, the application can calculate the optimal path or suggest a number of paths from which the user can select if more than one path satisfies the input criteria. The optimal path can for example be found by taking into account the cell information and user QoS over several possible paths from A to B. The cell information can for example be coverage, cell load and handover frequency. The application can retrieve this information from the Radio Network controller (RNC) or any other suitable network node of a cellular radio system having this information.

A user also can also input other criteria in the search for example the shortest path or the fastest path that will provide an acceptable QoS.

In accordance with one embodiment a method of providing a guaranteed quality of service to a subscriber of a service in a cellular radio system is described. In accordance with the method a start position and an end position is received together with a required quality of service, QoS. The cell site positions are associated with possible user geographical/street paths that will take the subscriber from the start position to the end position and search for paths that will guarantee the required QoS, and the path that best satisfies the entered input criteria is selected and output to the subscriber. Hereby the subscriber can be guaranteed a QoS when travelling from a start to an end position.

In accordance with one embodiment other input criteria can be received and the selection can be based on these additional input criteria as well. The other criteria can be one or many of: a maximum path length, a maximum estimated time to travel from the start position to the end position a stop position along the path from the start position to the end position a time when the travel from the start position to the end position is to take place.

In accordance with one embodiment, the method comprises prompting the cellular radio system to reserve resources for the selected path.

In accordance with one embodiment, the method comprises setting one or more parameters for the subscriber path to fulfill the QoS requirement. For example handover settings and handover triggering parameters can be set to give priority to a subscriber having input a path along the path input.

In accordance with one embodiment, the path is selected based on a cost function having as input parameters one or more of: coverage, cell load and handover cost.

In accordance with one embodiment the user direction/position is continuously determined and the user is warned about interruptions, coverage issues and overload cells before the user enters an area with anticipated problems from a QoS perspective in response to the determined position. The user may then choose to continue the original planed path or change to another path based on his preference.

The invention also extends to a device adapted to perform the above methods. The device can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
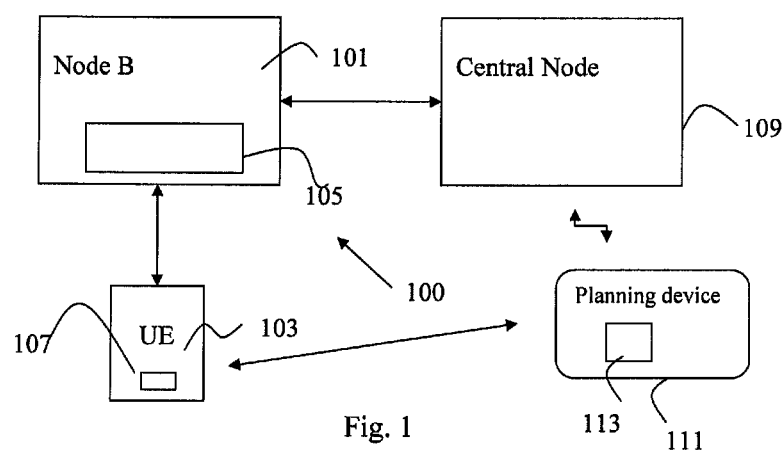
FIG. 1 is a view of a cellular radio system with a planning device.

In FIG. 1 a general view of a cellular radio system 100 is depicted. The system 100 depicted in FIG. 1 is a Universal Mobile Telecommunications System Terrestrial Radio Access Network (UTRAN) system. However it is also envisaged that the system can be an evolved UTRAN (E-UTRAN) system or another similar systems. The system 100 comprises a number of base stations 101, whereof only one is shown for reasons of simplicity. The base station 101 can be connected to by user equipments in the figure represented by the UE 103 located in the area served by the base station 101. The system 100 is further configured for multi carrier operation in at least the uplink. The base station and the user equipment further comprise controllers/controller circuitry 105 and 107 for providing functionality associated with the respective entities. The radio base station 101 can further be connected to a central node 109 for controlling a multitude of radio base stations. The central node 109 can in this exemplary embodiment be a radio Network Controller (RNC). It is however understood that the central node may be another node depending on the type of cellular radio system 100. FIG. 1 further depicts a planner device 111. The planner device has been depicted as a device outside the cellular radio system 100. This can for example be the case when the planning device is provided as an internet application that is accessed via the internet. However, is also envisaged that the planning device can be provided in the cellular radio system or as an application in the UE 103. The device 111 can be provided with controller circuitry for performing all the tasks that are required to perform the methods as described herein. The controllers/controller circuitry 105,107 and 113 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

In accordance with embodiments described herein methods are provided aiming to guarantee the QoS for services, in particular GBR services in mobility scenarios. The user can choose a QoS path for a given service. In accordance with one embodiment the optimum journey is determined from a QoS perspective. In accordance with another embodiment a path between (at least) two locations is determined that satisfies some input criteria in addition to a guaranteed QoS. The input criteria may be one or many of: distance or travel time. The user may also input one or many stops along the path from location A to location B.

Figure 2:
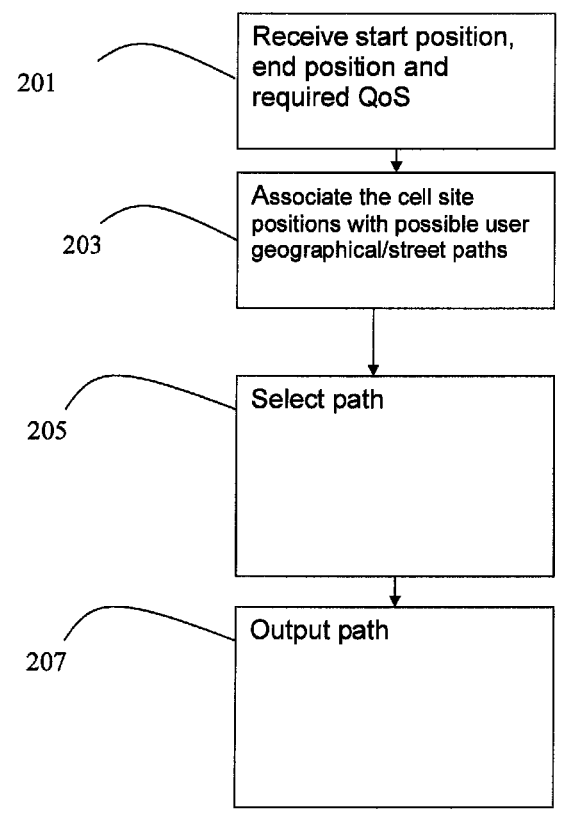
FIG. 2 is a flow chart depicting different steps performed when determining a path.

The QoS is guaranteed by performing the following steps in a planning device illustrated in the flowchart of FIG. 2. First, in a step 201, the start position and end position is entered along with a required QoS by a user/subscriber. Also other input criteria can be entered. The planning device then, in a step 203 associate the cell site positions with possible user geographical/street paths that will take the user from the start position to the end position and search for paths that will guarantee a particular QoS. The number of paths can be restricted by a number of different criteria such as user input criteria or a criteria set by the planning deices. For example only paths having a less distance than a predetermined factor, such as two times the shortest path, from the start position to the end position can be searched. When all possible paths or a maximum number of possible paths have been searched the planning device can select path that best satisfies the entered input criteria in a step 205. The selected path is the output the user in a step 207. For example if the user only is interested in a good QoS the output will be the path that has the best QoS when travelling from the start position to the end position. If on the other hand the input criteria were designed to find the shortest path that could guarantee a particular QoS then that path would be output from the search performed by the planning device.

Figure 3:
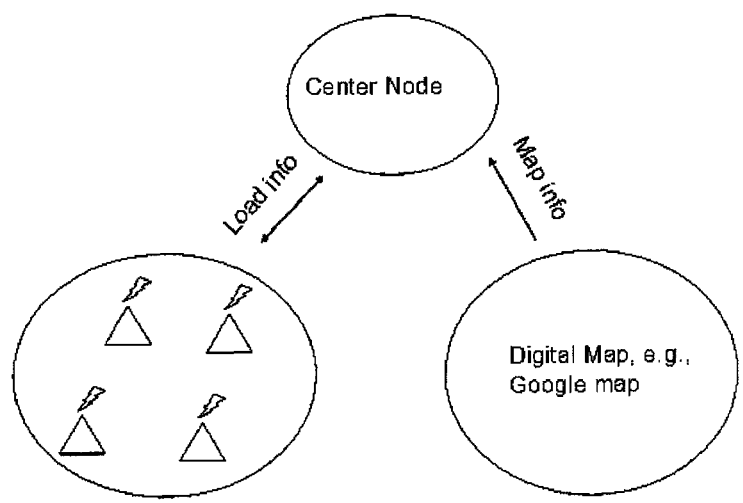
FIG. 3 is a view illustrating a scenario.

In order to associate the cell site positions with possible user geographical/street paths information from the cellular radio network can be collected, e.g. cell load information from all cells (interference, available resources etc.), the number of triggered handovers and coverage issues. An exemplary scenario is illustrated in FIG. 3.

The center node can for example be the RNC. The application can then access the information in RNC.

The load information of all cells can be distributed to a center node by the exchange of Radio Resource Control (RRC) signaling periodically. In case the key information in some cells change, the load information need be updated accordingly.

Below an exemplary scenario is described. Before starting a journey, a user determines what kind of services he/she prefers. As soon as he/she makes the decision, he/she can login to a specified web site (may be ran by the mobile system operator, or by traffic company, like bus or taxi, or subway, long-distance bus or even railway, air company etc.), and input information, which may include the start city, destination, and the planed date, and the service type (which maps to a predefined QoS requirement by the operator), and then let the application perform a search. In return, as output from the search the user will get optimum paths (possible more than 1 path). The user can choose the path based on his preference or input additional criteria to filter the best path. In accordance with one embodiment, when the user or system has selected a path based on the input of the user, the system can determine the related information, e.g. the cells that the user intends to travel through and also when this will be. In accordance with one embodiment the planning device can provide a prompt message to the system informing of the selected path. The cellular radio system can then reserve necessary resources along the selected path for this user in advance.

As above described, the service path may be searched based on a digital map, which includes the information such as the cell deployment, cell load, cell radio quality etc. This digital map can be updated whenever the key information is changed. The optimum paths could be defined and searched with the graphic theory.

Below an example of searching for an optimal QoS path on a High Speed Packet Access (HSPA) network is described.

Figure 4:
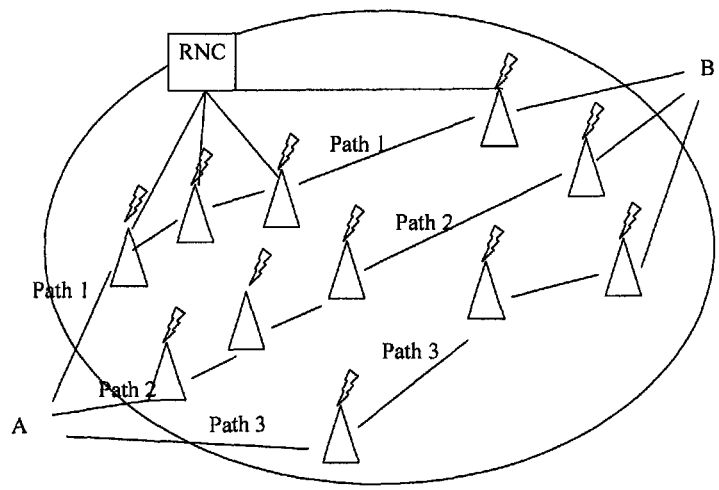
FIG. 4 is a view illustrating path selection.

In the example shown in FIG. 4, a user plans to drive from location A to location B. He wants to visit a friend who is living at B site. There is no scheduled time for his visiting, since he told his friend that he would drop by him in the afternoon. It is around 100 km long from A to B. It takes at least 1 hour for him to get there. During the journey, he plans to listen to some music streamed from the internet.

Before he leaves home, he searches the optimum paths from a web site providing such a service and that has access to a planning device as described herein. Based on his input, the application searches a digital map. The application finds that there are 3 alternative paths: Path 1, Path 2, and Path 3. Based on cell information from for example the RNC, the cost for each path may be estimated like below:

$$\text{Cost\_1} = f(\text{path 1, coverage, cell load, HO cost}) \quad (1)$$

$$\text{Cost\_2} = f(\text{path 2, coverage, cell load, HO cost}) \quad (2)$$

$$\text{Cost\_3} = f(\text{path 3, coverage, cell load, HO cost}) \quad (3)$$

Where $f(\ldots)$ denotes a function of the parameter within the parenthesis. In this example the parameters are coverage, cell load and handover cost for the respective paths. The coverage measurement can for example include the pathloss along the path. The cell load info indicates the load room of cells along the path. HO cost is a measurement of the HO related cost, for example, it is measured in terms of the trigged HO frequency. Based on the given criteria, the system calculates that path 1 is best one to fulfill the user QoS requirements during that planed time period. As a result the application on the web site will output path 1 as the best path for the user from location A to B.

When user decides to choose the Path 1, the application can in turn inform cellular radio system about the chosen path, and the system, in particular a node in the system such as the RNC can reserve resources along Path 1 for this user. This means that the system may release the resources of low priority users, for example, (non GBR users) in some cells to this user, or even increase the scheduling priority for this user when this user travels to cells which have scarce available resources along the path.

It is to be noted that the path searching can utilize other methods when searching for the best path using more or fewer parameters when searching for the best path.

Sometimes, users may have no time to do the search before his journey, or users may forget to perform a search, or even users have no network connection when he wants to do the search. In that case, the system can be configured to provide a reminder before he/she arrives at the HO areas. Then, users may choose another path if he thinks it to be necessary. For example a user is traveling via the Public transportation system. He is first taking a bus from location A along the path 2 in FIG. 4, and he is watching TV from internet with his mobile terminal. The application notices that this user will become service limited soon, since there is a radio coverage interruption along path 2. So, the application would give a message to this user and suggest another path, such as path 3 in FIG. 4. As soon as the user notices this message, he can choose to switch to path 3 if he wants to.

When suggesting a path, the system can estimate QoS requirements for this user. With the estimated QoS requirements, the same procedure may be performed as above to choose the best QoS path for this user. In some other cases messages of paths with good (above some predefined quality level) QoS can be delivered to some public traffic vehicles, and then displayed on a big monitor, in case the public traffic company is the customer of this service.

The invention claimed is:

1. A method of providing a guaranteed quality of service to a subscriber of a service in a cellular radio system, the method comprising:
   receiving a start and an end position as a first input criteria from the subscriber,
   receiving a required quality of service, QoS, as a second input criteria from the subscriber,
   associating cell site positions with possible user geographical/street paths that will take the subscriber from the start position to the end position and search for paths that will guarantee the required QoS,
   selecting the path that best satisfies the received first and second input criteria, wherein the path is selected, at least in part, based on a cost function having as input parameters one or more of: coverage, cell load and handover cost, and
   outputting the selected path to the subscriber.

2. The method according to claim 1 wherein other input criteria are received.

3. The method according to claim 2, wherein the other criteria is one or more of: a maximum path length, a maximum estimated time to travel from the start position to the end positions, a stop position along the path from the start position to the end position, and a time when the travel from the start position to the end position is to take place.

4. The method according to claim 1, further comprising prompting the cellular radio system to reserve resources for the selected path.

5. The method according to claim 1, further comprising setting one or more parameters for the subscriber path to fulfill the QoS requirement.

6. The method according to claim 1, further comprising continuously determining the subscriber position and warning about one or more of interruptions, coverage issues and overload cells in response to the determined position.

7. A planning device for providing a guaranteed quality of service to a subscriber of a service in a cellular radio system, the device comprising:
   controller circuitry for receiving a start position and an end position as a first input criteria from the subscriber,
   controller circuitry for receiving a required quality of service, QoS, as a second input criteria from the subscriber,
   controller circuitry for associating site positions with possible user geographical/street paths that will take the subscriber from the start position to the end position and search for paths that will guarantee the required QoS,
   controller circuitry for selecting the path that best satisfies the received first and second input criteria, wherein the path is selected, at least in part, based on a cost function having as input parameters one or more of: coverage, cell load and handover cost, and controller circuitry for outputting the selected path to the subscriber.

8. The planning device according to claim 7, wherein the planning device is configured to receive other input criteria.

9. The planning device according to claim 8, wherein the other criteria is one or more of: a maximum path length, a maximum estimated time to travel from the start position to the end position, a stop position along the path from the start position to the end position, and a time when the travel from the start position to the end position is to take place.

10. The planning device according to claim 7 wherein the planning device is configured to prompt the cellular radio system to reserve resources for the selected path.

11. The planning device according to claim 7, wherein the planning device is configured to prompt the cellular radio system to set one or more parameters for the subscriber path to fulfill the QoS requirement.

12. The planning device according to claim 7, wherein the planning device is configured to continuously determine the subscriber position and warning about one or more of interruptions, coverage issues and overload cells in response to the determined position.

* * * * *